US011380001B2

(12) United States Patent
Yan et al.

(10) Patent No.: US 11,380,001 B2
(45) Date of Patent: Jul. 5, 2022

(54) IMAGE REGISTRATION QUALIFICATION (71) Applicant: KONINKLIJKE PHILIPS N.V., Eindhoven (NL)

(72) Inventors: Pingkun Yan, Gaithersburg, MA (US); Jochen Kruecker, Andover, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/977,423

(22) PCT Filed: Feb. 26, 2019

(86) PCT No.: PCT/EP2019/054766
§ 371 (c)(1),
(2) Date: Sep. 1, 2020

(87) PCT Pub. No.: WO2019/166447
PCT Pub. Date: Sep. 6, 2019

(65) Prior Publication Data
US 2020/0410696 A1    Dec. 31, 2020

Related U.S. Application Data (60) Provisional application No. 62/637,553, filed on Mar. 2, 2018, provisional application No. 62/677,334, filed on May 29, 2018.

(51) Int. Cl.
*G06K 9/00* (2022.01)
*G06T 7/30* (2017.01)
(Continued)

(52) U.S. Cl.
CPC .............. *G06T 7/30* (2017.01); *G06K 9/623* (2013.01); *G06K 9/6232* (2013.01);
(Continued)

(58) Field of Classification Search
CPC .............. G06T 7/30; G06T 7/0012; G06T 2207/20084; G06T 2207/10132;
(Continued)

(56) References Cited

U.S. PATENT DOCUMENTS 10,290,097 B2 *   5/2019   Shin .................. G06V 10/46
2009/0244561 A1 *  10/2009  Mongeon ............ H04N 1/00002
                                                        358/1.9
(Continued)

FOREIGN PATENT DOCUMENTS

| WO | WO2017054715 A1 | 4/2017 |
| WO | WO2017080869 A1 | 5/2017 |
| WO | WO2017121834 A1 | 7/2017 |

OTHER PUBLICATIONS

PCT International Search Report, International application No. PCT/EP2019/054766, dated May 14, 2019.
(Continued)

*Primary Examiner* — Van D Huynh
(74) *Attorney, Agent, or Firm* — Sherry Austin (57) ABSTRACT

A controller for qualifying image registration includes a memory that stores instructions; and a processor that executes the instructions. When executed by the processor, the instructions cause the controller to execute a process that includes receiving first imagery of a first modality and receiving second imagery of a second modality. The process executed by the controller also includes registering the first imagery of the first modality to the second imagery of the second modality to obtain an image registration. The image registration is subjected to an automated analysis as a qualifying process to qualify the image registration. The image registration is variably qualified when the image registration passes the qualifying process, and is not qualified when the image registration does not pass the qualifying process.

20 Claims, 8 Drawing Sheets

(51) Int. Cl.
G06T 7/00 (2017.01)
G06K 9/62 (2022.01)
G06N 3/04 (2006.01)
G06N 3/08 (2006.01)

(52) U.S. Cl.
CPC ............ *G06N 3/0481* (2013.01); *G06N 3/08* (2013.01); *G06T 7/0012* (2013.01); *G06T 2207/10088* (2013.01); *G06T 2207/10132* (2013.01); *G06T 2207/20081* (2013.01); *G06T 2207/20084* (2013.01)

(58) Field of Classification Search
CPC . G06T 2207/10088; G06T 2207/20081; G06T 2207/30081; G06K 9/6232; G06K 9/623; G06N 3/0481; G06N 3/08; G06N 3/0454
USPC ........................................................ 382/128
See application file for complete search history.

(56) References Cited

U.S. PATENT DOCUMENTS

| 2015/0016728 | A1* | 1/2015 | Parthasarathy | G06T 7/33 382/195 |
| 2016/0093048 | A1* | 3/2016 | Cheng | G06K 9/6215 382/131 |
| 2016/0120468 | A1 | 5/2016 | Mathew | |
| 2016/0120482 | A1 | 5/2016 | Kirenko | |
| 2017/0278241 | A1* | 9/2017 | Abramoff | G16H 50/20 |
| 2017/0337682 | A1* | 11/2017 | Liao | G06T 7/0012 |
| 2018/0330511 | A1* | 11/2018 | Ha | G06V 10/7515 |
| 2018/0374194 | A1* | 12/2018 | Park | G06T 7/30 |
| 2020/0013141 | A1* | 1/2020 | Park | G06T 7/30 |

OTHER PUBLICATIONS

Yan P. et al., "Adversarial Image Registration with Application for MR and TRUS Image Fusion", arxiv.org, Cornell University Library, 201 Olin Library Cornell University Ithaca, NY 14853, Apr. 30, 2018 (Apr. 30, 2018), XP081062395.
Pluim J. et al., "The Truth is Hard to Make: Validation of Medical Image Registration", 2016 23rd International Conference On Pattern Recognition (ICPR), IEEE, Dec. 4, 2016 (Dec. 4, 2016), pp. 2294-2300, XP033085929.
Denis E. et al., "Automated Computed Tomography-Ultrasound Cross-Modality 3-D Contouring Algorithm for Prostate", Ultrasound in Med. & Biol., 41(10), pp. 2646-2662, 2015.
Simonosky M. et al., "A Deep Metric for Multimodal Registration", International Conference on Medical Image Computing and Computer-Assisted Intervention, MICCAI 2016, pp. 10-18.
Gutierrez-Becker B. et al., "Guiding Multimodal Registration with Learned Optimization Updates", Medical Image Analysis, 41, 2017, pp. 2-17.
Xi C. et al., "Deep Similarity Learning for Multimodal Medical Images", Apr. 2016, Computer Methods in Biomechanics and Biomedical Engineering Imaging & Visualization 6(3):1-5 DOI: 10.1080/21681163.2015.1135299.

* cited by examiner

IMAGE REGISTRATION QUALIFICATION

CROSS-REFERENCE TO RELATED APPLICATIONS

This patent application claims the priority benefit under 35 U.S.C. § 371 of International Patent Application no. PCT/EP2019/054766, filed Feb. 26, 2019, which claims the benefit of U.S. Application Ser. No. 62/637,553, filed on Mar. 2, 2018 and U.S. Application Ser. No. 62/677,334 filed on May 29, 2018. These applications are hereby incorporated by reference herein in their entirety.

BACKGROUND

Interventional medical procedures are procedures in which tools are used in a human body, and these types of medical procedures have become common in part due to proliferated use of imagery used to guide such interventional medical procedures. Fusion of imagery of multiple modes from multiple sources has become increasingly common in clinical practice, and this too has become commonly used for interventional medical procedures. It is often desired to integrate multiple images carrying complementary information into the same imaging space for guiding biopsy, treatment, as well as monitoring. For example, in image-guided targeted biopsy or localized therapy, targeted locations in the human body may be identified from a source different than a real-time imaging modality. For instance, targets may be identified from prior high resolution diagnostic imaging, such as magnetic resonance imaging (MRI) or computed tomography (CT), and then transferred to a real-time imaging modality like ultrasound (US) for guidance. Alternatively, targets may be identified from prior biopsies or local treatments with the same imaging modality but a different volume space. Prior biopsy locations can also be mapped from an older MRI to a new MRI for follow-up biopsy.

Image registration is a key process for ensuring success of fusion of imagery. Fusion involves fusing different images into the same space. External fiducials can be used to create the image registration, in which case errors in the image registration are easily assessed. For example, a tool known as a Fiducial Registration Error metric is used to assess errors in image registration. However, sometimes simple metrics of registration error such as external fiducials cannot be used, such as when external fiducials cannot be captured in one or both of the imaging modes. For example, in some products used to align MRI and ultrasound volumes of the prostate, there are no mechanisms for checking quality of image registration, and providing feedback to users before proceeding with the interventional medical procedure.

For guided medical interventions using fused imagery, accurate alignment of the imagery is important. Since the image appearances of MRI and ultrasound are quite different, it can be very challenging to tell if a registration is good or not. Without a good registration to obtain the accurate alignment, the information from one image can be mapped to a wrong location of another image. If that happens, instead of guiding the procedure in the right way, fused imagery can be misleading, which then requires that physicians performing the guided medical interventions adjust mentally to obtain good results. However, before performing such adjustments, the physicians have to recognize that the image registration is less than optimal, and even recognizing that the registration is off may depend on the experience level of physicians using a system and their understanding of image registration. Inasmuch as poor registration may not be recognized, a user may proceed with a procedure which results in a poor clinical outcome. Moreover, there is a steep learning curve before one can align a pair of MRI and ultrasound images well.

SUMMARY

According to an aspect of the present disclosure, a controller for qualifying image registration includes a memory that stores instructions; and a processor that executes the instructions. When executed by the processor, the instructions cause the controller to execute a process that includes receiving first imagery of a first modality and receiving second imagery of a second modality. The process executed by the controller also includes registering the first imagery of the first modality to the second imagery of the second modality to obtain an image registration. The image registration is subjected to an automated analysis as a qualifying process. The image registration is also variably qualified when the image registration passes the qualifying process and is not qualified when the image registration does not pass the qualifying process.

According to another aspect of the present disclosure, a method for qualifying image registration includes receiving first imagery of a first modality and receiving second imagery of a second modality. The method also includes registering, by a processor of a controller that executes instructions stored in a memory of the controller, the first imagery of the first modality to the second imagery of the second modality to obtain an image registration. The image registration is subjected to an automated analysis as a qualifying process. The image registration is also variably qualified when the image registration passes the qualifying process and is not qualified when the image registration does not pass the qualifying process.

According to yet another aspect of the present disclosure, a system for qualifying image registration includes a magnetic resonance imaging (MRI) system, an ultrasound probe, and a controller including a memory that stores instructions and a processor that executes the instructions. The magnetic resonance imaging system generates first imagery of a first modality. The ultrasound probe generates second imagery of a second modality. The instructions cause the controller to execute a process that includes receiving the first imagery of a first modality and receiving the second imagery of a second modality. The process executed by the controller also includes registering, by the processor, the first imagery of the first modality to the second imagery of the second modality to obtain an image registration. The image registration is subjected to an automated analysis as a qualifying process. The image registration is also variably qualified when the image registration passes the qualifying process and is not qualified when the image registration does not pass the qualifying process.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only, and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As described herein, problems resulting from poor registration of imagery used in interventional medical procedures are avoided by automatically assessing the quality of multimodal image registration and then providing feedback to users. Especially if the quality of image registration is not acceptable, image registration qualification described below may suggest that users fine tune registration before proceeding. As a result, user error can be reduced, which can further improve the overall performance of an image fusion guided interventional system.

Image registration qualification as described herein relates to the subject matter of U.S. Provisional Patent Application No. 62/637,553, filed on Mar. 2, 2018, the contents of which are incorporated by reference hereby in their entirety.

Figure 1:
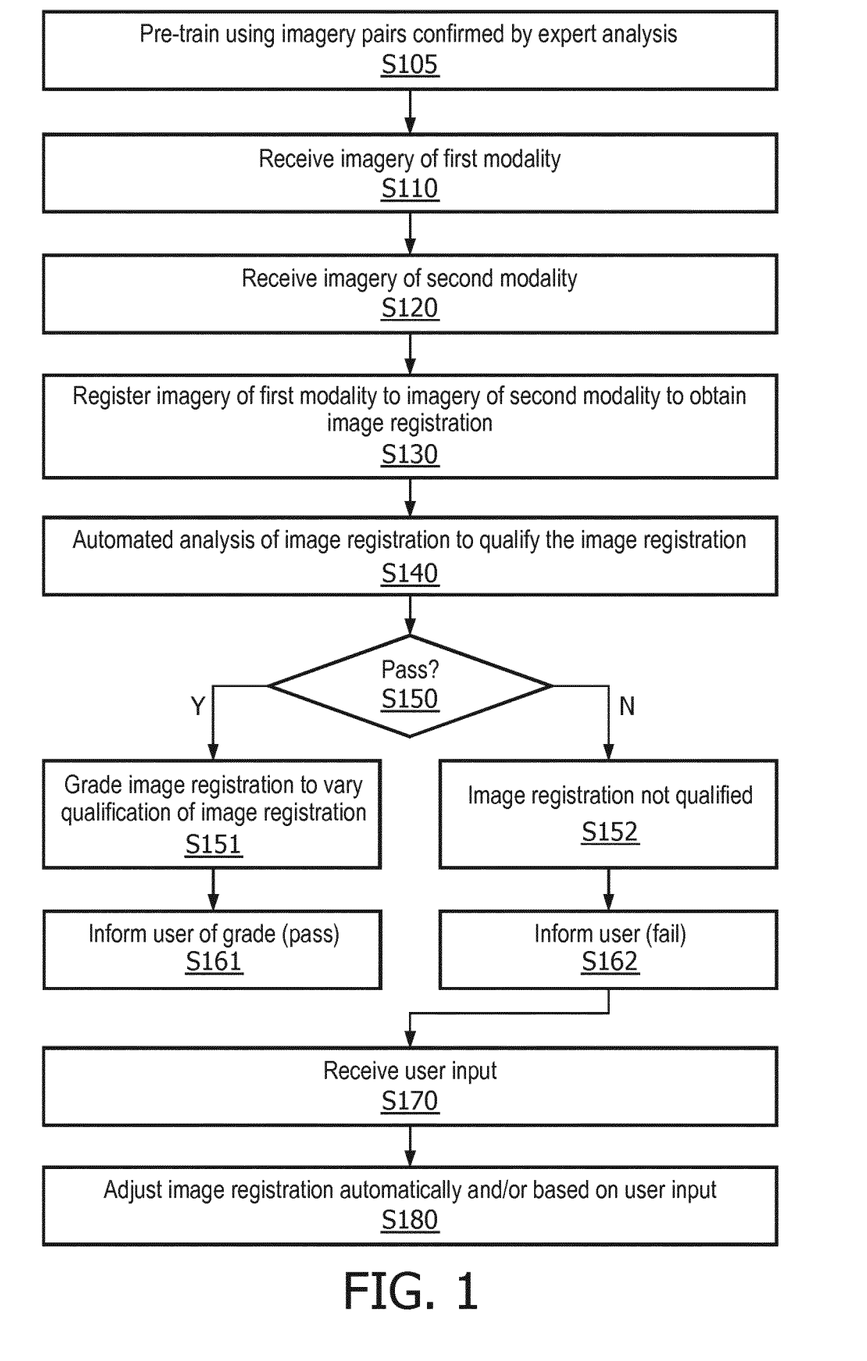
FIG. 1 illustrates a process for image registration qualification, in accordance with a representative embodiment.

FIG. 1 illustrates a process for image registration qualification, in accordance with a representative embodiment.

In FIG. 1, the process starts with pre-training at S105 using imagery pairs confirmed by expert analysis. The imagery pairs are thus preapproved pairs of imagery of the same subject. For example, pairs of imagery of the same subject matter from two different modalities may be registered, and an expert user can qualify the image registration manually. Different modalities may mean that images are from different sources, different systems, different types of systems that vary based on how human tissue is stimulated in the process of generating the images, and/or different types of systems that vary based on how images are captured. Unless otherwise specified, modalities and modes as described herein do not differ based simply on different settings of a single system or device, or different times of image capture, or different subject matter captured in the images.

The pre-training can be done dozens, hundreds, and even thousands of times, and can even include use of image registrations of terrible quality. As a result, numerous image registrations can be input to a system for image registration qualification, and subject to deep learning so that the system learns characteristics of image registrations that are good versus image registrations that are bad. Deep learning is a form of machine learning, and is based on learning representations of data, as opposed to task-specific algorithms. Automated analysis performed later may be based on numerous preapproved pairs of imagery deemed good, and at least one preapproved pair of imagery deemed bad. The expert users may score the pairs of imagery and resultant image registrations, such as by a score of 1 to 100 or 1 to 1000. Additionally, the expert users may score the pairs of imagery and resultant image registrations for different individual characteristics, using the same type of numerical scoring methods. Additionally, the expert users may provide an optimal alignment of each image pair, and an automated process may create "deteriorated" versions of the image alignment by introducing random rotations, translations and/or deformations of various magnitudes to at least one of the images in each image pair. The process may also automatically score the misaligned image pair based on the magnitude of the transformation that was introduced.

At S110, imagery of a first modality is received. Examples of modalities for the present disclosure include magnetic resonance imaging, ultrasound, X-ray, and other forms of medical imaging. Each modality is differentiated by, for example, how images are obtained. For example, ultrasound uses sound waves to produce images inside a human body. Magnetic resonance imaging is somewhat more complicated than ultrasound, so a brief explanation of magnetic resonance imaging is warranted. Magnetic resonance imaging uses magnets to align and realign hydrogen nuclei (protons) in water molecules in a subject (e.g., human) being imaged. Strong magnetic fields are applied to align and realign the proton "spins". Radio frequency (RF) coils are then used to selectively deliver a B1 field in a transmit stage. In a receive stage, the hydrogen atoms return to an original position (i.e., the position before the selective delivery of the B1 field) and emanate a weak radio frequency signal which can be picked up and used to produce images.

At S120, imagery of a second modality is received. In an example where the first modality is ultrasound, the second modality may be magnetic resonance imaging. In the example where the first modality is magnetic resonance imaging, the second modality may be ultrasound.

At S130, the imagery of the first modality is registered to the imagery of the second modality to obtain an image registration. Registration involves aligning the imagery of the first modality and the imagery of the second modality to a common coordinate system, so that the same features in the imagery of the different modalities are aligned at the same coordinates. Registration may involve matching one coordinate system to another, matching landmarks in one imaging modality to the same landmarks in the other imaging modality, resizing one imaging modality to match the size of the other imaging modality, or other known forms of establishing alignment between two separate images of the same scene. Imagery from one modality may be designated reference imagery or fixed imagery, and geometric transformations or local displacements can be applied to the other imagery from the other modality so that the imagery from the two imaging modalities aligns.

At S140, an automated analysis as a qualifying process is applied to the image registration, to qualify the image registration. The automated analysis is based on the learning involving preapproved pairs of imagery. The image correspondences found in the automated analysis at S140 are thus learned through sets of training images, rather than being hand-engineered. Without loss of generality, magnetic resonance imaging and ultrasound fusion for image guided targeted prostate biopsy can be used for illustration.

Figure 5:
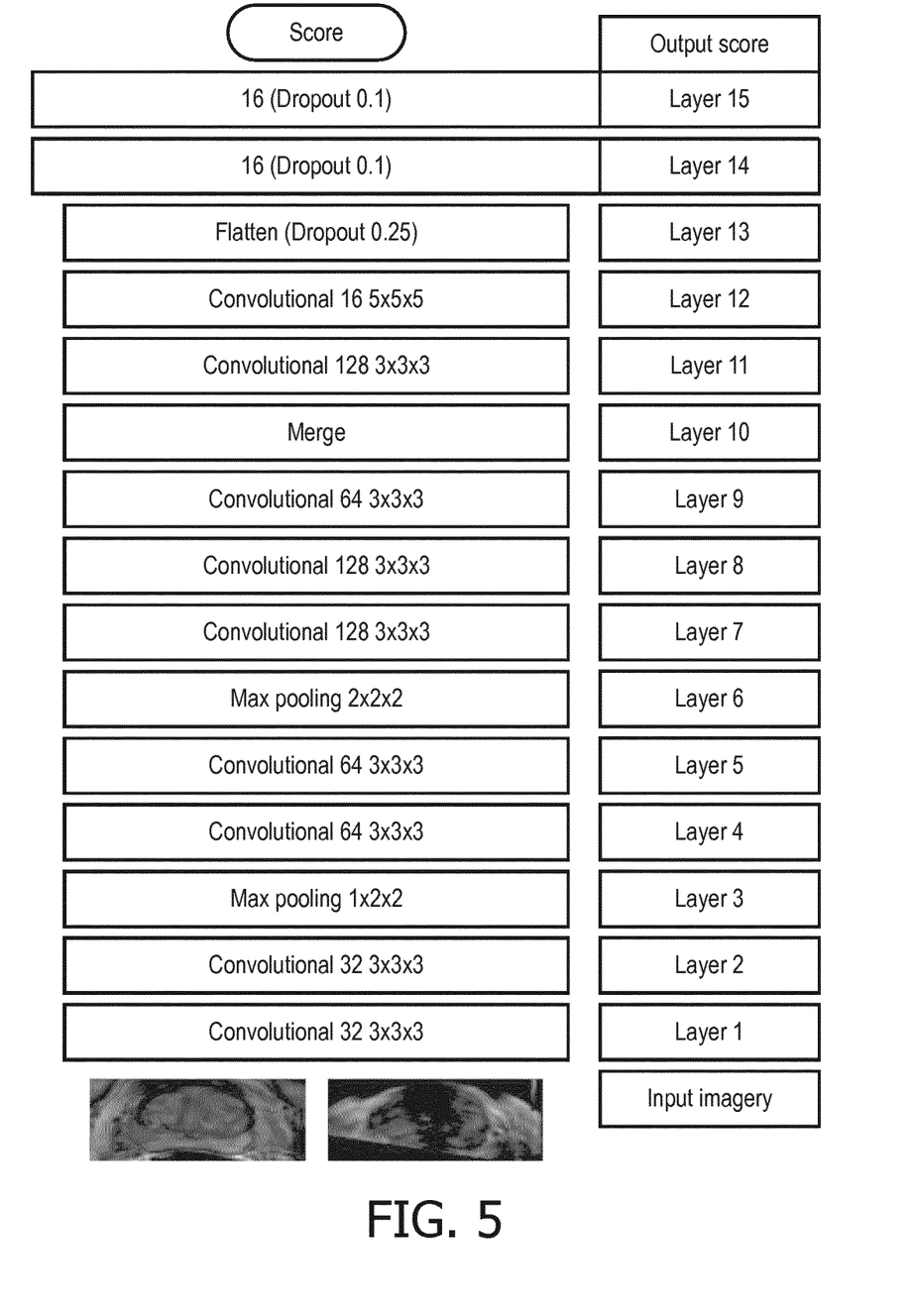
FIG. 5 illustrates an implementation of an automated analysis as a qualifying process based on a learning method for image registration qualification, in accordance with a representative embodiment.

"Deep Learning" strategies can be used for a range of image analysis problems. According to an aspect of the present disclosure that is different from a typical use of deep learning for object detection such as for detecting organs/features in ultrasound images, the deep learning technique used here is employed to extract image features from a given pair of magnetic resonance imaging and ultrasound images to check their matches. Instead of identifying a particular kind of image feature to infer the existence of some object, the deep learning application described herein learns to extract image features and then evaluate a registration based on the correspondence of the features. FIG. 5 described below shows an implementation of such a learning method for measuring the quality of magnetic resonance imaging and ultrasound image registration. Using a network of layers as in FIG. 5, the correspondence will be learned automatically by an algorithm. To make the system a success, two key factors have to be satisfied. One is powerful computational ability, which has been provided by GPU (graphics processing unit) computation. The other factor is a large enough training data set. In the example network shown in FIG. 5, a pair of magnetic resonance imaging and ultrasound patches (in either 2D or 3D) are given to the network of layers as input. The output at the top of the network of layers is a score of the registration. In between, a series of convolutional layers, max pooling layers, and fully connected layers are used for extracting image features and making scoring decisions. With enough training data, the parameters of the network will be trained to generate meaningful scores. The convolutional layers perform convolutional analysis.

Metrics for evaluating the quality of image registration can be learned through learning image feature correspondence. Moreover, criteria for registration accuracy can be designed to categorize registration accuracy into different levels. Users can be allowed to automatically or semi-automatically (e.g., with automated assistance) adjust image registration when errors are deemed excessive, and specific indications of quality can be provided to users. Examples of specific indications include warning messages.

Once the quality of image registration can be measured by the network of layers shown in FIG. 5, the registrations can be categorized according to the scores generated through the automated analysis at S140. Thresholds can be used for categorization and can be learned from training data. By using registration fine-tuned by doctors as a ground (baseline) truth, a set of misaligned images can be generated by varying away from the ground truth. The intentionally misaligned image pairs will be used as negative samples for training. Therefore, a classifier for categorizing registration can be achieved.

At S150, the process determines whether the image registration passes. For example, the process of FIG. 1 may compare a score generated as a result of the automated process to a predetermined threshold. The predetermined threshold may be a selected threshold of multiple available thresholds that vary based on the first modality and the second modality, based on the subject matter in the imagery pairs, based on input such as a selection from an operator, or based on other criteria.

At S152, the image registration is determined to not qualify (S150=No). For example, the determination that the image registration does not qualify may be based on a score that results from the automated analysis is S140. The score may be above a threshold that requires the score to be low, or below a threshold that requires the score to be high.

At S162, the user is informed that the image registration does not qualify. The user is informed by an output system, such as a display or a speaker. The user may be informed by a visual warning that varies based on a magnitude by which the image registration does not pass the qualifying. For instance, a color or intensity of an electronic display may vary based on the magnitude by which the image registration does not pass. The display may also indicate the location within the images where significant misalignment or the largest misalignment is detected. A warning may also include the display or highlighting of the image region where significant misalignment or the worst misalignment occurs. Alternatively, the user may be informed by an audible warning from a speaker that varies based on a magnitude by which the image registration does not pass the qualifying. An audible warning may vary, for example by volume, tone, different patterns of sounds such as beeps, different speeds of sounds such as beeps, or other ways that would inform a user of a relative urgency of a warning.

At S151, the image registration passes (S150=Yes) and is graded to vary the qualification of the image registration. The image registration may pass by meeting a threshold, and may be graded variably to inform the user of the trustworthiness and reliability of the image registration. Passing grades may be numeric, such as 1 to 10 or 1 to 100, or alphabetical, such as A to F or A to Z, or alphanumerical.

At S161, the user is informed that the image registration qualifies (passes). The user may be informed visually or audibly, in the same way that a user is informed of failure of the image registration at S162.

At S170, user input is received after the user is informed of the failure of the image registration at S162. Here, the user may be prompted to provide input to adjust the image registration, such as by aligning a specific point on one of the imagery pairs to a specific point on the other of the imagery pairs, or by aligning multiple such points that are visually confirmable to be unaligned. The user may also be prompted to adjust one of the imagery pairs entirely in a direction such as right or left or up or down. User input may be provided by voice, cursor, mouse, touch, keyboard, or any other known mechanism for providing user input to a computing and/or communications device.

At S180, the image registration is adjusted either automatically and/or based on user input. That is, the image registration that fails at S150 may be adjusted based on the user input received at S170. Alternatively, or additionally, the image registration may be adjusted automatically, such as by reperforming the image registration in light of the failure at S150.

Figure 6A:
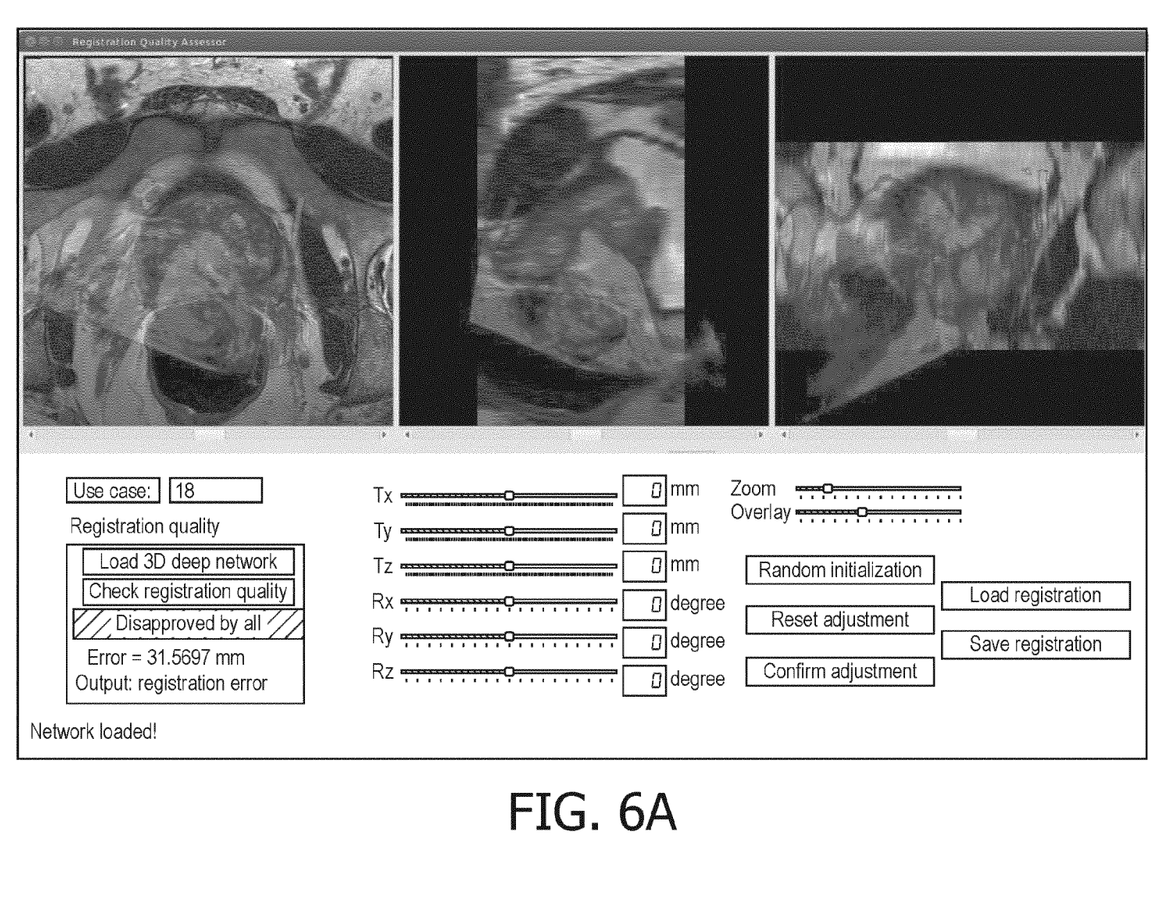
FIG. 6A illustrates a first (poor) registration subjected to image registration qualification, in accordance with a representative embodiment.
Figure 6B:
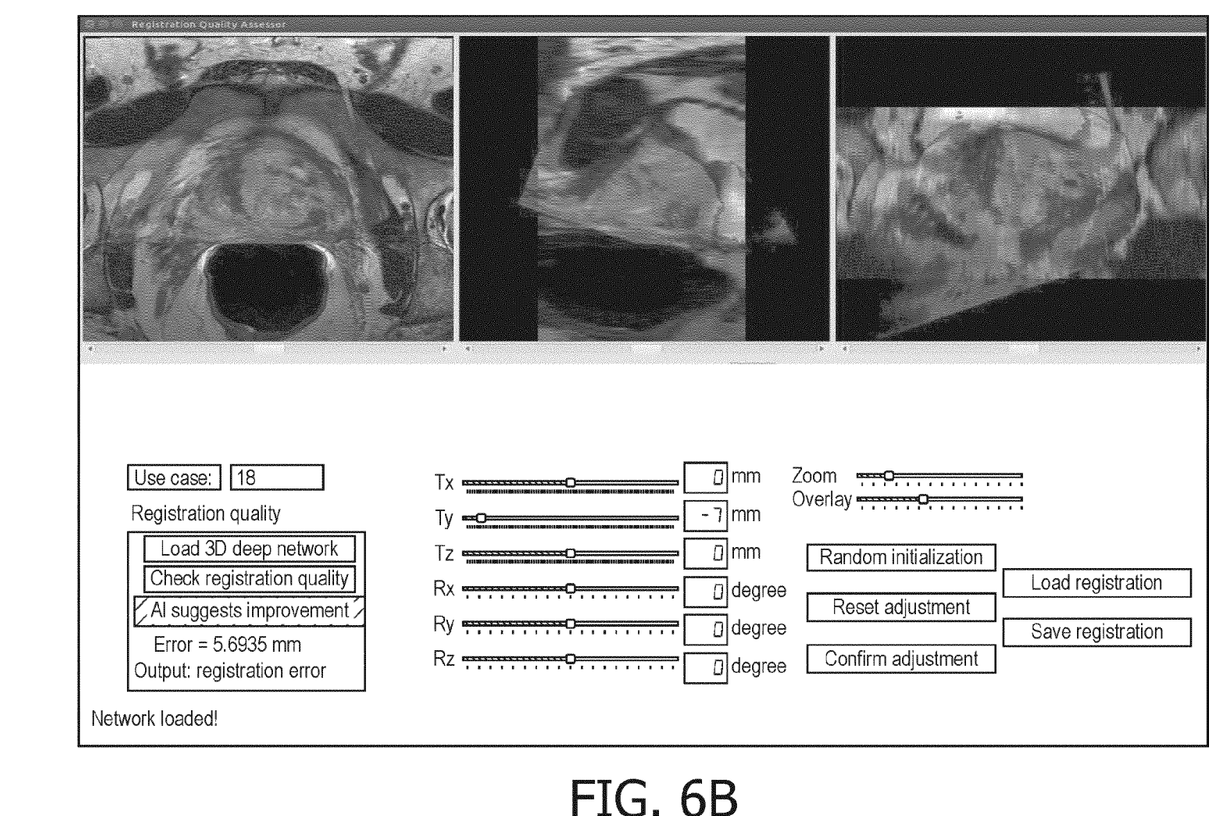
FIG. 6B illustrates a second (improved) registration subjected to image registration qualification, in accordance with a representative embodiment.
Figure 6C:
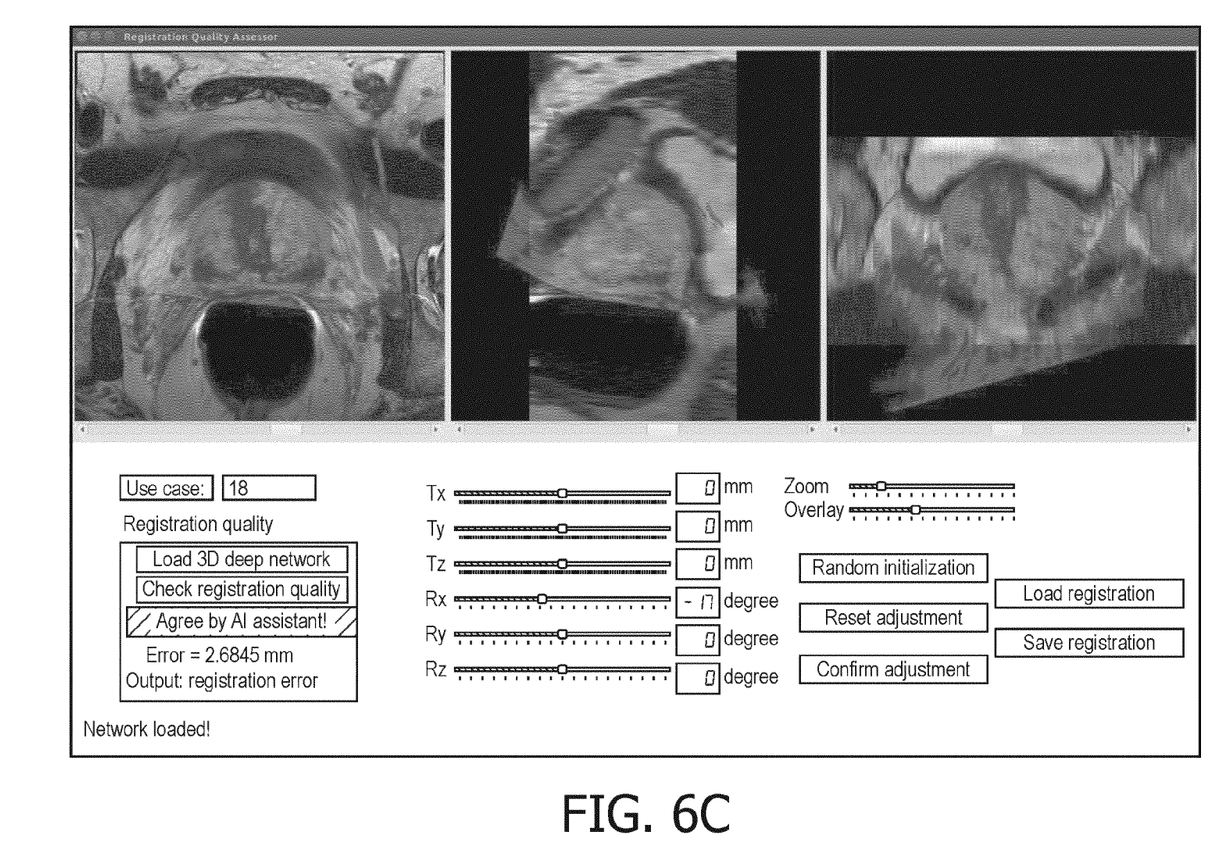
FIG. 6C illustrates a third (good) registration subjected to image registration qualification, in accordance with a representative embodiment.

As part of the workflow, image registration qualification allows a user to adjust image registration either manually or semi-automatically or automatically at S180. This functionality can be used in two places, including to obtain training data for learning image registration quality assessment, and to improve image registration during a live procedure. That is, automated analysis performed during a live procedure may be based on preapproved pairs of imagery used to obtain training data used in the automated analysis. An adjustment interface is shown in FIG. 6A, FIG. 6B and FIG. 6C as soft buttons on a display, and can be implemented by using soft buttons as control units, for example buttons and sliding bars. Interaction may be allowed directly over image pairs, for example using a mouse interaction to implement translation and rotation. The adjustment interface may also be through a remote-control device, for example gesture or voice commands.

Figure 2:
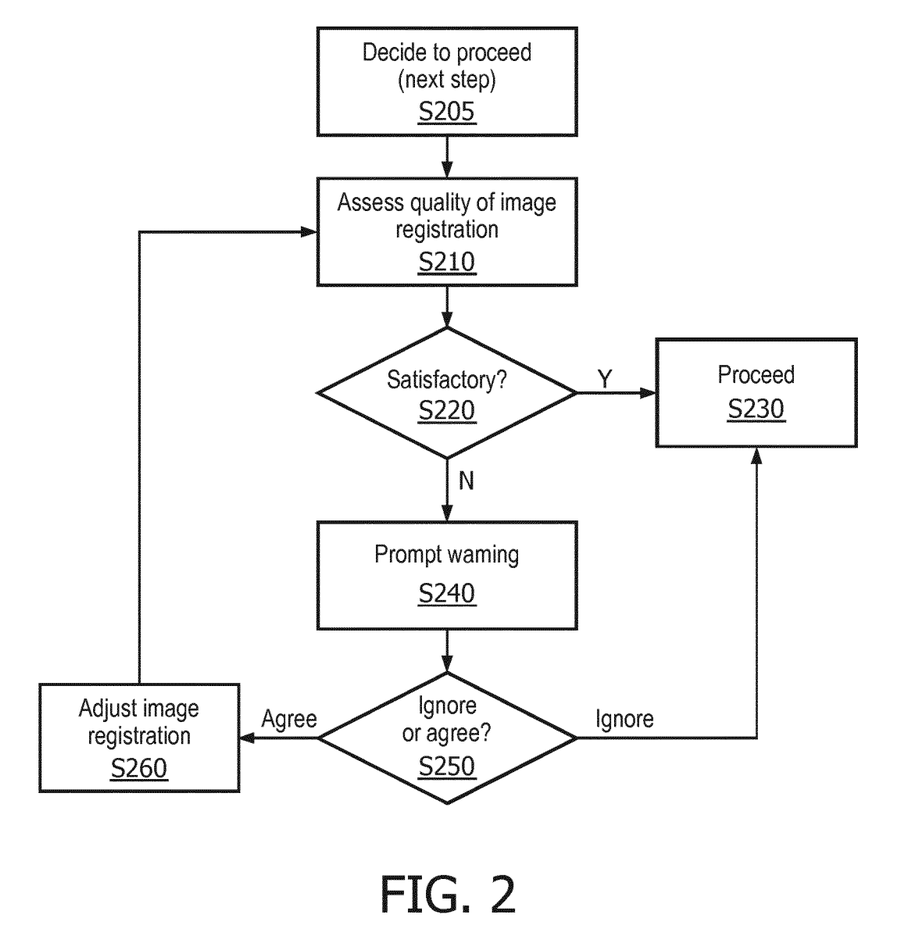
FIG. 2 illustrates another process for image registration qualification, in accordance with a representative embodiment.

FIG. 2 illustrates another process for image registration qualification, in accordance with a representative embodiment.

In FIG. 2, the process starts by deciding to proceed to a next step, such as an interventional medical procedure, at S205. As a result of deciding to proceed, the quality of an image registration is assessed at S210. The image registration may be assessed insofar as it is needed for the next step. At S220, a determination is made whether the image registration quality is satisfactory. If the image registration quality is satisfactory at S220, the process proceeds to the next step at S230 and the process ends after, for example, outputting approval of the image registration quality. The process may end after an output system outputs approval, notifying the user that the image registration quality is satisfactory. The output system can be controlled by a controller to output approval and output warnings, as described herein.

If the image registration quality is unsatisfactory at S220, a warning is used to prompt the user at S240. The user can agree with the warning at S250 so that the image registration is adjusted at S260 and then reassessed at S210. Alternatively, the user can ignore the warning at S250, and proceed with the next step at S230 such that the process ends.

In the process of FIG. 2, the user is warned of a potentially inaccurate image registration that will be used for fusing images for procedure guidance. Once a user wants to move to the next step starting at S205, the system will assess the quality of the image registration at S210 using the network of layers shown in FIG. 5 learned earlier. If the assessment considers the registration satisfactory at S220, it will be recommended to move to the next step at S230. Otherwise, the warning message will be prompted to the user at S240, showing that the registration may not be accurate and should be improved. The user may have the right to ignore the message and continue to the next step (S250=Ignore). Or the user accepts the suggestion (S250=Agree), and improves the registration by using adjustment tools described herein at S260, until the registration is satisfactory.

The warning message in FIG. 2 is not limited to text displays such as alphabetical, numerical, or alphanumerical messages. A warning can also be a visual sign, such as a sign with colors including green indicating a good registration and red indicating a requirement for further improvement. The warning message may also be an audible signal with certain sounds indicating that the registration may not be accurate. A warning may also be sensed by touch, such as by vibrating a device to warn the user. The warning may also include the display or highlighting of the image region where significant misalignment or the worst misalignment occurs.

Figure 3:
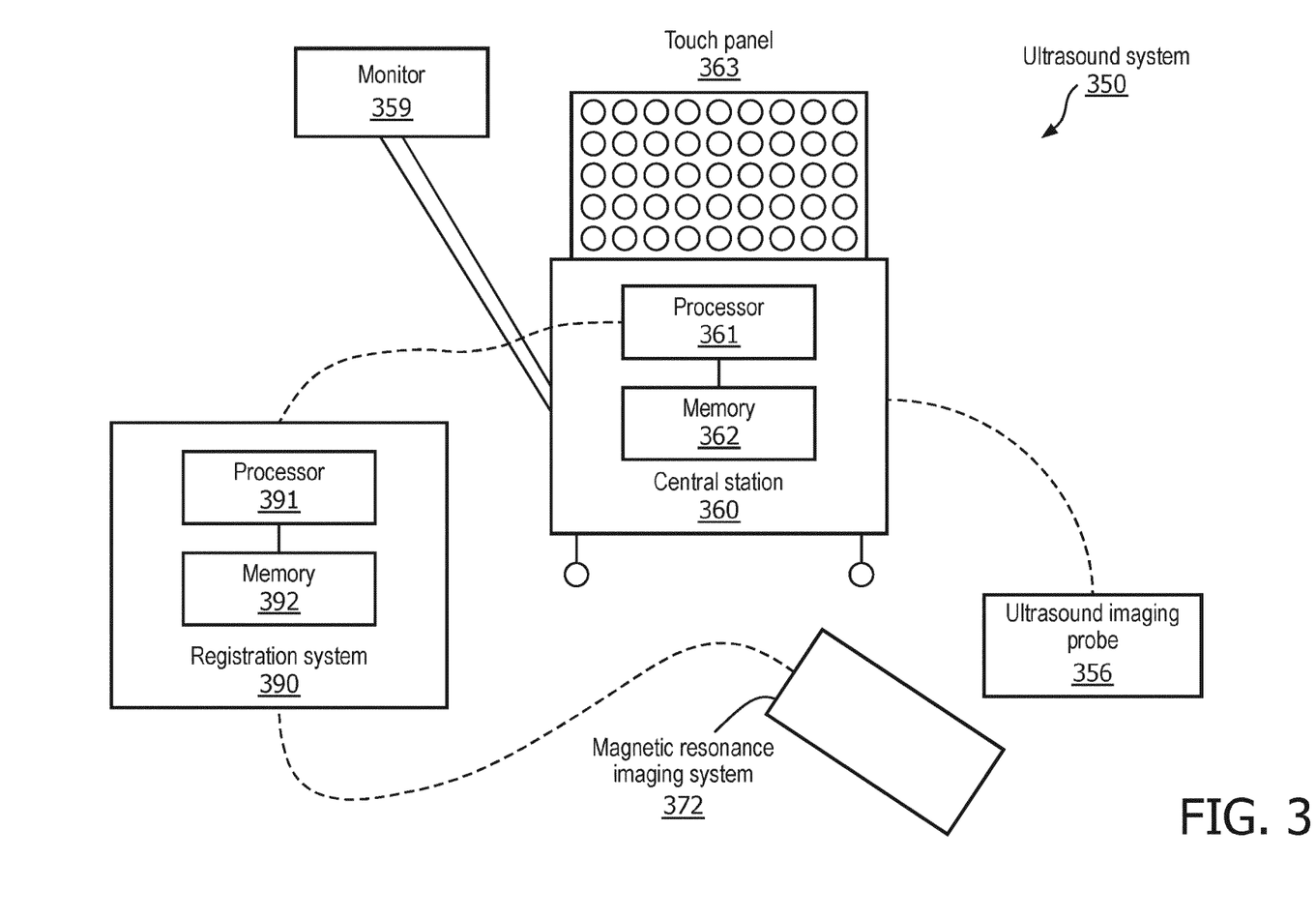
FIG. 3 illustrates a system for image registration qualification, in accordance with a representative embodiment.

FIG. 3 illustrates a system for image registration qualification, in accordance with a representative embodiment.

In FIG. 3, an ultrasound system 350 includes a central station 360 with a processor 361 and memory 362, a touch panel 363, a monitor 359, and an ultrasound imaging probe 356 connected to the central station 360 by a data connection (e.g., a wired or wireless data connection). Although not shown, an interventional medical device may also be connected to the central station 360 via another data connection (e.g., a wired or wireless data connection), such as when the first imagery or second imagery are being provided live during an interventional medical operation.

A magnetic resonance imaging system 372 may be used to generate the first imagery or second imagery. Alternatively, an X-Ray emitter may be provided as an alternative to the magnetic resonance imaging system 372, or to the ultrasound system 350. Other sources of first imagery or second imagery can also be used as alternatives or additions to the ultrasound system 350 and the magnetic resonance imaging system 372.

A registration system 390 includes a processor 391 and a memory 392. The registration system 390 receives data from the magnetic resonance imaging system 372 and the central station 360. The registration system 390 performs processes described herein by, for example, the processor 391 executing instructions in the memory 392. However, the registration system 390 may also be implemented in or by the central station 360, or in any other appropriate mechanism. The combination of the processor 391 and memory 392, whether in the registration system 390 or in another configuration, may be considered a "controller" as the term is used herein.

Registration of the first imagery and the second imagery by the registration system 390 allows a view from the ultrasound imaging probe 356 to be shown overlaid properly on a view from the magnetic resonance imaging system 372. In alternative embodiments, the first imagery and/or the second imagery are not provided "live" during an interventional medical operation, and may be provided to the registration system 390 remotely from a remote location over a communications network.

An example use of registration is when an interventional medical device is placed internally into a patient during a medical procedure. The image registration qualification can vary based on a metric that varies based on a type of medical procedure. For instance, image registration may require meeting a higher threshold for one type of surgery or other intervention than for another type of surgery or other intervention.

Registration can be used to show, for example, locations of the interventional medical device as seen in first imagery generated using the ultrasound imaging probe 356 overlaid and aligned on tissue, organs or bone as seen in second imagery generated using the magnetic resonance imaging system 372. Accurate alignment allows an operator to accurately see the interventional medical device relative to the tissue, organs or bone.

When the registration does not pass the automated analysis performed by the registration system 390, the user may be notified as this may mean, for example, that a spatial position of an ultrasound image shown on a screen cannot be trusted. For example, an outline of the first imagery or the second imagery may be colored white or red, or may flash. Alternatively, a text warning can be shown on the monitor 359, or an audible warning may be provided from a speaker, or a control such as a handle on the ultrasound imaging probe 356 may vibrate. The user then has the choice to adjust the image registration, as described for S260 in FIG. 2 and S180 in FIG. 1. In addition to re-analyzing one or both of the first imagery and second imagery, new imagery may also be acquired based on a determination of a failed registration.

Figure 4:
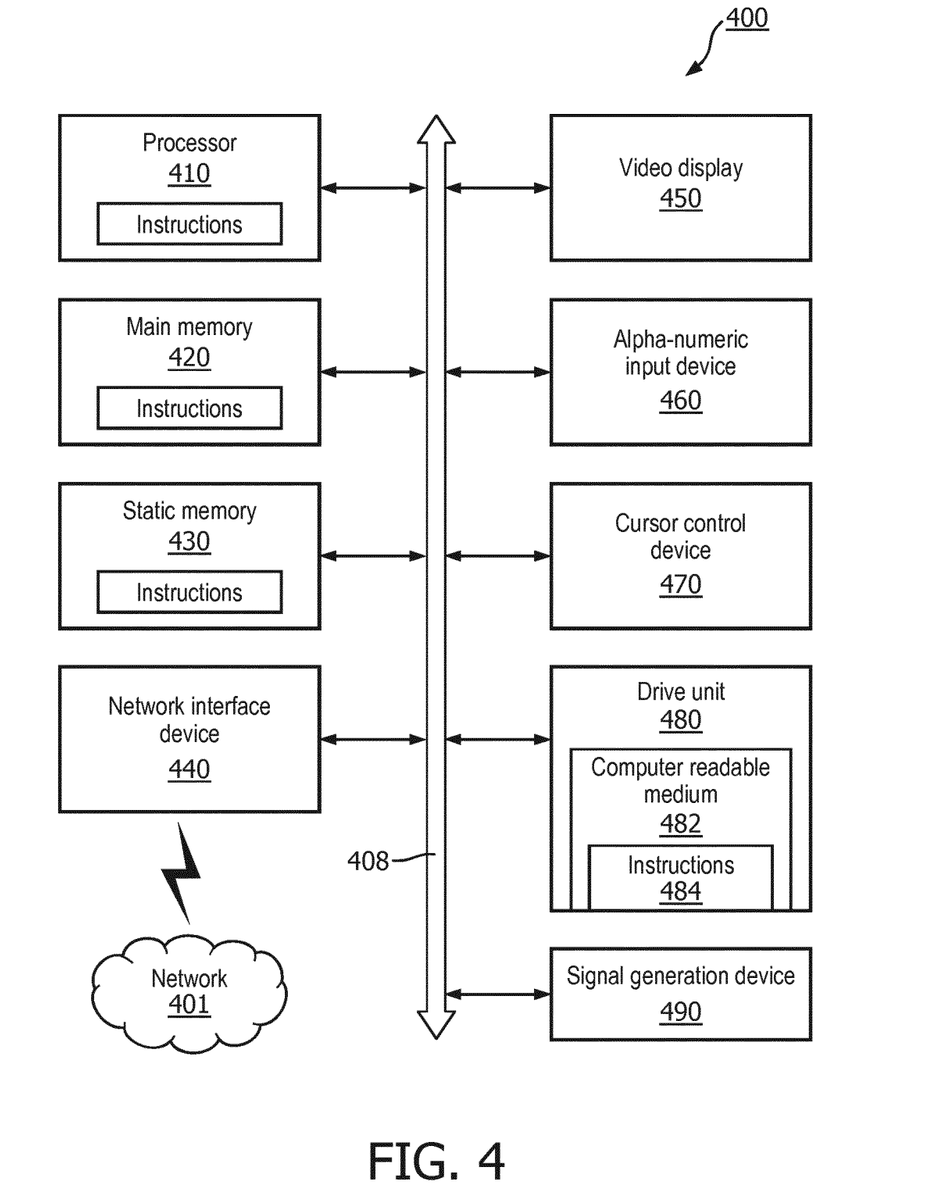
FIG. 4 illustrates a general computer system, on which a method of image registration qualification can be implemented, in accordance with a representative embodiment.

FIG. 4 illustrates a general computer system, on which a method of image registration qualification can be implemented, in accordance with a representative embodiment.

The computer system 400 can include a set of instructions that can be executed to cause the computer system 400 to perform any one or more of the methods or computer based functions disclosed herein. The computer system 400 may operate as a standalone device or may be connected, for example, using a network 401, to other computer systems or peripheral devices.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a stationary computer, a mobile computer, a personal computer (PC), a laptop computer, a tablet computer, an ultrasound system, an ultrasound imaging probe a central station, a registration system, or any other machine capable of executing a set of instructions (sequential or otherwise) that specify actions to be taken by that machine. The computer system 400 can be incorporated as or in a device that in turn is in an integrated system that includes additional devices. In an embodiment, the computer system 400 can be implemented using electronic devices that provide voice, video or data communication. Further, while computer system 400 is shown and illustrated as a single system, the term "system" shall also be taken to include any collection of systems or sub-systems that individually or jointly execute a set, or multiple sets, of instructions to perform one or more computer functions.

As illustrated in FIG. 4, the computer system 400 includes a processor 410. A processor for a computer system 400 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A processor is an article of manufacture and/or a machine component. A processor for a computer system 400 is configured to execute software instructions to perform functions as described in the various embodiments herein. A processor for a computer system 400 may be a general-purpose processor or may be part of an application specific integrated circuit (ASIC). A processor for a computer system 400 may also be a microprocessor, a microcomputer, a processor chip, a controller, a microcontroller, a digital signal processor (DSP), a state machine, or a programmable logic device. A processor for a computer system 400 may also be a logical circuit, including a programmable gate array (PGA) such as a field programmable gate array (FPGA), or another type of circuit that includes discrete gate and/or transistor logic. A processor for a computer system 400 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 400 includes a main memory 420 and a static memory 430 that can communicate with each other via a bus 408. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 400 may further include a video display unit 450, such as a liquid crystal display (LCD), an organic light emitting diode (OLED), a flat panel display, a solid-state display, or a cathode ray tube (CRT). Additionally, the computer system 400 may include an input device 460, such as a keyboard/virtual keyboard or touch-sensitive input screen or speech input with speech recognition, and a cursor control device 470, such as a mouse or touch-sensitive input screen or pad. The computer system 400 can also include a disk drive unit 480, a signal generation device 490, such as a speaker or remote control, and a network interface device 440.

In an embodiment, as depicted in FIG. 4, the disk drive unit 480 may include a computer-readable medium 482 in which one or more sets of instructions 484, e.g. software, can be embedded. Sets of instructions 484 can be read from the computer-readable medium 482. Further, the instructions 484, when executed by a processor, can be used to perform one or more of the methods and processes as described herein. In an embodiment, the instructions 484 may reside completely, or at least partially, within the main memory 420, the static memory 430, and/or within the processor 410 during execution by the computer system 400.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 482 that includes instructions 484 or receives and executes instructions 484 responsive to a propagated signal; so that a device connected to a network 401 can communicate voice, video or data over the network 401. Further, the instructions 484 may be transmitted or received over the network 401 via the network interface device 440.

FIG. 5 illustrates an implementation of an automated analysis as a qualifying process based on a learning method for image registration qualification, in accordance with a representative embodiment.

In FIG. 5, an automated analysis as a qualifying process includes convolutional computation at multiple convolutional layers for extracting joint image features of the first imagery and the second imagery. The automated analysis in FIG. 5 also includes weighted linear combination of layers followed by non-linear activations for scoring the extracted features. The weights used in the weighting are learned in a training phase.

In more detail, the automated analysis in FIG. 5 is for assessing the quality of image registration. Since an organ can have very different appearances in different modalities, it is hard to manually define image features to correlate the images together. In FIG. 5, the correlations (correspondences) between images of the same features in different modalities are learned in a training stage that involves a set of training images. The training stage uses deep learning rather than hand-engineering. In the embodiment of FIG. 5, the input at the bottom includes imagery from the MRI modality and imagery from the ultrasound modality. The imagery used as the input in FIG. 5 is fused for image guided targeted prostate biopsy.

Deep learning strategies have recently been used successfully for a range of image analysis problems. For image registration qualification, the deep learning is different from a typical use of deep learning for object detection. For instance, when detecting organs/features in MRI imagery and ultrasound imagery, the deep learning technique in image registration qualification is employed to extract image features from a given pair of MRI images and ultrasound images to check their matches. Instead of identifying a particular kind of image feature to infer the existence of some object, the deep learning application in image registration qualification learns to extract image features and then evaluate a registration based on the correspondence of the features.

In FIG. 5, the automated analysis involves multiple layers of analysis to get from the input imagery at the bottom to the output score at the top. Using the network of layers in FIG. 5, the correspondence can be learned automatically by an algorithm. Two key factors are satisfied to make the network of layers in FIG. 5 work. One key factor is powerful computational ability, which has been provided by computation by a graphics processing unit (GPU). The other key factor is possession and use of a large enough training data set. In the example network of layers in FIG. 5, a pair of MRI and ultrasound patches (in either 2D or 3D) are given to the network of layers as input. The output at the top of the network of layers is a score of the registration. In between, a series of convolutional layers (i.e., layer 1, layer 2, layer 4, layer 5, layer 7, layer 8, layer 9, layer 11 and layer 12), max pooling layers (i.e., layer 3 and layer 6), and fully connected layers (i.e., layer 14 and layer 15) are used for extracting image features to make the scoring decision. With enough training data, the parameters of the network will be trained to generate meaningful scores.

As is known, convolutional layers apply a convolution operation to the input, and pass a result to the next layer. Max pool layers use the maximum value from each of a cluster of neurons at the prior layer. For example, max pooling involves non-linear functionality to reduce the size of the input data set. As a general matter, the representation of the input imagery becomes coarser during the process of FIG. 5 from bottom to top, as repeated convolution and max pooling combines detailed pixel-by-pixel information into features that represent information from an entire neighborhood of pixels. As is also known, insofar as networks of layers as in FIG. 5 reduce sizes of data sets, layer 14 and layer 15 at the very top are even shown to drop random fractions of 10% (0.1) of the input data set, which increases the stability of the network against overfitting, i.e. the tendency of a network to learn features that are very specific to the training data set but which do not generalize to new data not seen during training. However, the fractions dropped are not limited to 10% as this number is arbitrarily used herein, and an actual fraction used in layer 14, layer 15 or similar layers may be more or less than 10%.

Once the quality of image registration can be measured, the registrations can be categorized according to the scores. The thresholds used for categorization can also be learned from training data. Alternatively, the thresholds can be defined manually, depending on the type of images and intended use of the images for medical procedures. By using registrations fine-tuned by professionals to produce the training data set as ground truth, a set of misaligned images can be generated by varying away from the ground truth. The misaligned image pairs will be used as negative samples for training. Since automated analysis is ultimately based on pairs of imagery used as inputs to a registration process, preapproved pairs of imagery analyzed in training can be used as a basis for the automated analysis through the training stages. The preapproved pairs of imagery analyzed in training can include at least one pair of imagery that serves as a negative sample. Therefore, a classifier for categorizing registration can be achieved, and the training data set will have data inputs confirmed to produce a positive result (registration) and data inputs confirmed to produce a negative result (failure).

In FIG. 5, weighted linear combinations are applied between any two layers. The non-linear activations can be applied at any layer to nullify specific data input that does not meet a threshold, such that the data can be ignored. Activation means the data is set (weighted) to zero when it does not meet a threshold. The weights used for the weighted linear combinations are learned in the training stage, and automated analysis in FIG. 5 is based on weights, such as when determining which data to discard due to low weightings.

As shown in FIG. 5, automated analysis can include convolutional computation at multiple convolutional layers. The convolutional computing involves extracting joint image features of the first imagery and the second imagery, i.e., features that are present in both the first imagery and the second imagery. The automated analysis can also include weighted linear combination of layers followed by non-linear activations for scoring the extracted joint image features. The weights used in the weighting can be learned in a training phase.

FIG. 6A illustrates a first (poor) registration subjected to image registration qualification, in accordance with a representative embodiment.

In the example of FIG. 6A, a large error is estimated by the algorithm that performs the automated analysis. As shown, a message of "Disapproved by AI!" is highlighted visually, and the error is estimated to be 31.5697 mm. The output is indicated to be a registration error. In FIG. 6A, a variety of input settings are also shown, including a zoom setting and an overlay setting. Controls to reset an adjustment and confirm an adjustment are also shown, along with controls for loading a registration and saving a registration. A large error is not limited to 31.5697 mm, as a large error may be more or less and may vary depending on the context in which the automated analysis is performed. Accordingly, a relatively "large" error may be more or less than 31.5697 mm in embodiments.

More particularly, in FIG. 6A, six (6) slider bars are used for controlling 3D translations and rotations. As a user adjusts image registration, the red label in the feedback area at the lower left corner in FIG. 6A may turn yellow or green as the alignment improves. The aligned improvements are shown below in FIG. 6B and FIG. 6C.

FIG. 6B illustrates a second (improved) registration subjected to image registration qualification, in accordance with a representative embodiment.

In the example of FIG. 6B, an estimated error is smaller than in the example of FIG. 6A. The estimated error is estimated by the algorithm that performs the automated analysis. As shown, a message of "AI suggests improvement" is highlighted visually, such as in a different color (yellow) than the color (red) of the message in FIG. 6A. The error is estimated to be 5.6935 mm. In FIG. 6B, the same variety of input settings are shown as in FIG. 6A, including a zoom setting and an overlay setting. Controls to reset an adjustment and confirm an adjustment are also shown, along with controls for loading a registration and saving a registration. The error in FIG. 6B is not limited to 5.6935 mm any more than a large error in FIG. 6A would be limited to 31.5697 mm, as FIG. 6B illustrates that an error smaller than that present in FIG. 6A generates a different result than in FIG. 6A. The magnitudes of errors which lead to either result may be more or less and may vary depending on the context in which the automated analysis is performed.

FIG. 6C illustrates a third (good) registration subjected to image registration qualification, in accordance with a representative embodiment.

In the example of FIG. 6C, an estimated error is smaller than in the examples of FIG. 6A and FIG. 6B, and is considered good. The estimated error is estimated by the algorithm that performs the automated analysis. As shown, a message of "Agree by AI assistant" is highlighted visually, such as in a different color (green) than the color (yellow) of the message in FIG. 6B or than the color (red) of the message in FIG. 6A. The error is estimated to be 2.6845 mm. In FIG. 6C, the same variety of input settings are shown as in FIG. 6A and FIG. 6B, including a zoom setting and an overlay setting. Controls to reset an adjustment and confirm an adjustment are also shown, along with controls for loading a registration and saving a registration. The smaller estimated error in FIG. 6C is not limited to 2.6845 mm, as a smaller estimated error may be more or less and may vary depending on the context in which the automated analysis is performed. Accordingly, a relatively "smaller" error may be more or less than 2.6845 mm in embodiments.

In the examples of FIG. 6A, FIG. 6B and FIG. 6C, the image registrations may be performed, re-performed, and re-performed again, such as by allowing a user to adjust the initial registration, or by automatically adjusting the initial registration.

Accordingly, image registration qualification enables corrections for inaccurate and clinically unacceptable registration that would otherwise be used for fusing images to guide interventional procedures. The corrections are enabled by automatically assessing the quality of image registration and then giving feedback to users. Especially if the quality of image registration is not acceptable, the image registration qualification may suggest users to fine tune registration before proceeding. As a result, the operator error can be reduced, which can further improve the overall performance of an interventional system guided by image fusion.

Although image registration qualification has been described with reference to several exemplary embodiments, it is understood that the words that have been used are words of description and illustration, rather than words of limitation. Changes may be made within the purview of the appended claims, as presently stated and as amended, without departing from the scope and spirit of image registration qualification in its aspects. Although image registration qualification has been described with reference to particular means, materials and embodiments, image registration qualification is not intended to be limited to the particulars disclosed; rather image registration qualification extends to all functionally equivalent structures, methods, and uses such as are within the scope of the appended claims.

For example, image registration qualification has been described mainly in the context of registrations involving magnetic resonance imaging and ultrasound. However, image registration itself is performed using input images from a variety of imaging modes, even if considered only in the context of medical imaging. Nevertheless, image registration qualification is applicable to many or perhaps all imaging modes that can be registered, insofar as the deep learning aspects used as the basis of the automated analysis are applicable to registration for many or perhaps all imaging modes. As a result, operator error can be reduced for many different imaging modes and medical procedures.

In alternative embodiments, the adjustment of image registration can be performed automatically, by using a quality metric derived from the learning phase as a metric to be optimized in an automatic optimization scheme. That is, a learned metric can serve as a metric for multi-modal similarity in an image registration process. This is similar to mutual information (Mutual Information), but is highly specialized for specific use cases such as specific pairs of modalities, organs, views obtained, and so on.

Additionally, while the processes of FIG. 1 and FIG. 2 show most or all of the central features of image registration qualification, such features may be eliminated or supplemented. For example, feedback or a warning may be provided to a user whenever a bad/unacceptable registration is detected but without forcing the user to react to the warning. In other words, the warning can be displayed in parallel to the ongoing workflow, which may involve a registration that changes in real-time, such as due to patient/tissue motion. Many other features may be added to supplement the processes shown and described, and individual steps of the processes shown and described may be altered or eliminated without departing from the scope and spirit of image registration qualification.

In yet other embodiments, a training phase may be provided by a specific operator, or amended/supplemented by the operator, so as to allow customized quality objectives for individual users/institutions. This customization provides a workflow for expert users to provide additional or new ground-truth registrations. Additionally, customization can allow the system to re-train features that indicate good registrations. Moreover, customization can allow the system to modify the ground-truth registrations to create "incorrect" registrations in order to learn features representing incorrect registrations.

Image registration qualification may also be used as a modification to a variety of existing products and systems using image fusion for interventional guidance. Examples of systems that can be modified to include image registration qualification include a variety of ultrasound imaging and navigation systems.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A controller for qualifying image registration, comprising:
   a memory that stores instructions; and
   a processor that executes the instructions,
   wherein, when executed by the processor, the instructions cause the controller to execute a process comprising:
     receiving first imagery of a first modality;
     receiving second imagery of a second modality;
     registering the first imagery of the first modality to the second imagery of the second modality to obtain an image registration;

subjecting the image registration to an automated analysis as a qualifying process including variably qualifying the image registration when the image registration passes the qualifying process and not qualifying the image registration when the image registration does not pass the qualifying process; and adjusting the image registration after not qualifying the image registration when the image registration does not pass the qualifying process, wherein the adjusting the image registration is based on input prompted from a user after not qualifying the image registration.

2. The controller of claim 1,
wherein the automated analysis comprises convolutional computation at multiple convolutional layers for extracting joint image features of the first imagery and the second imagery and weighted linear combination of layers, followed by non-linear activations for scoring the extracted joint image features, and weights used in the weighting are learned in a training phase.

3. The controller of claim 1, wherein the process executed by the processor further comprises:
comparing the image registration to a predetermined threshold to variably qualify whether the image registration passes the qualifying process.

4. The controller of claim 1, wherein the process executed by the processor further comprises:
controlling an output system to provide a warning when the image registration does not pass the qualifying process and/or to output approval when the image registration passes the qualifying process.

5. The controller of claim 4,
wherein the output system comprises a display, and
the warning comprises a visual warning that varies based on a magnitude by which the image registration does not pass the qualifying process.

6. The controller of claim 5,
wherein the warning comprises a visual indication of a region of the first imagery and/or second imagery in which the image registration does not pass the qualifying process.

7. The controller of claim 4,
wherein the output system comprises a speaker, and
the warning comprises an audible warning that varies based on a magnitude by which the image registration does not pass the qualifying process.

8. The controller of claim 1,
wherein the automated analysis is based on preapproved pairs of imagery in the first modality and the second modality, including at least one preapproved pair of imagery that does not pass the qualifying process and that is used to train the controller.

9. The controller of claim 1,
wherein the first modality comprises ultrasound and the second modality comprises magnetic resonance imaging (MRI).

10. The controller of claim 1,
wherein the automated analysis applies deep learning in which instructions executed by the processor are used to identify and extract image features from the first imagery and the second imagery and evaluate correspondence of the image features and/or wherein the automated analysis is based on pairs of imagery in the first modality and the second modality that are used to train a process of the automated analysis.

11. The controller of claim 1,
wherein the variably qualifying is based on a metric that varies based on a type of medical procedure for which the first imagery and the second imagery are generated.

12. The controller of claim 1,
wherein at least one of the first imagery or the second imagery are generated and received in real-time during a medical procedure.

13. The controller of claim 1,
wherein the automated analysis comprises convolutional analysis at multiple convolutional layers based on extracting image features of the first imagery and the second imagery and scoring the image features based on weights learned in a training phase.

14. A method for qualifying image registration, comprising:
receiving first imagery of a first modality;
receiving second imagery of a second modality;
registering, by a processor of a controller that executes instructions stored in a memory of the controller, the first imagery of the first modality to the second imagery of the second modality to obtain an image registration;
subjecting the image registration to an automated analysis as a qualifying process including variably qualifying the image registration when the image registration passes the qualifying process and not qualifying the image registration when the image registration does not pass the qualifying process; and
adjusting the image registration after not qualifying the image registration when the image registration does not pass the qualifying process, wherein the adjusting the image registration is based on input prompted from a user after not qualifying the image registration.

15. The method of claim 14, wherein at least one of the first imagery or the second imagery are generated and received in real-time during a medical procedure.

16. The method of claim 14, wherein the variably qualifying is based on a metric that varies based on a type of medical procedure for which the first imagery and the second imagery are generated.

17. The method of claim 14, wherein the first modality comprises ultrasound and the second modality comprises magnetic resonance imaging (MRI).

18. A system for qualifying image registration, comprising:
a controller for qualifying image registration, comprising:
a memory that stores instructions; and
a processor that executes the instructions,
wherein, when executed by the processor, the instructions cause the controller to execute a process comprising:
receiving first imagery of a first modality;
receiving second imagery of a second modality;
registering the first imagery of the first modality to the second imagery of the second modality to obtain an image registration;
subjecting the image registration to an automated analysis as a qualifying process including variably qualifying the image registration when the image registration passes the qualifying process and not qualifying the image registration when the image registration does not pass the qualifying process; and
adjusting the image registration after not qualifying the image registration when the image registration does not pass the qualifying process, wherein the adjusting the image registration is based on input prompted from a user after not qualifying the image registration;

an ultrasound probe that generates the second imagery of a second modality; and a magnetic resonance imaging (MRI) system that generates the first imagery of a first modality.

19. The system of claim 18, wherein the automated analysis is based on preapproved pairs of imagery in the first modality and the second modality, including at least one preapproved pair of imagery that does not pass the qualifying process and that is used to train the controller.

20. The system of claim 18, wherein the process executed by the processor of the controller further comprises:

controlling an output system to provide a warning when the image registration does not pass the qualifying process and/or to output approval when the image registration passes the qualifying process.

* * * * *